L. SMITH.
Apparatus for Extracting Oils, &c.
No. 46,033.
Patented Jan'y 24, 1865.
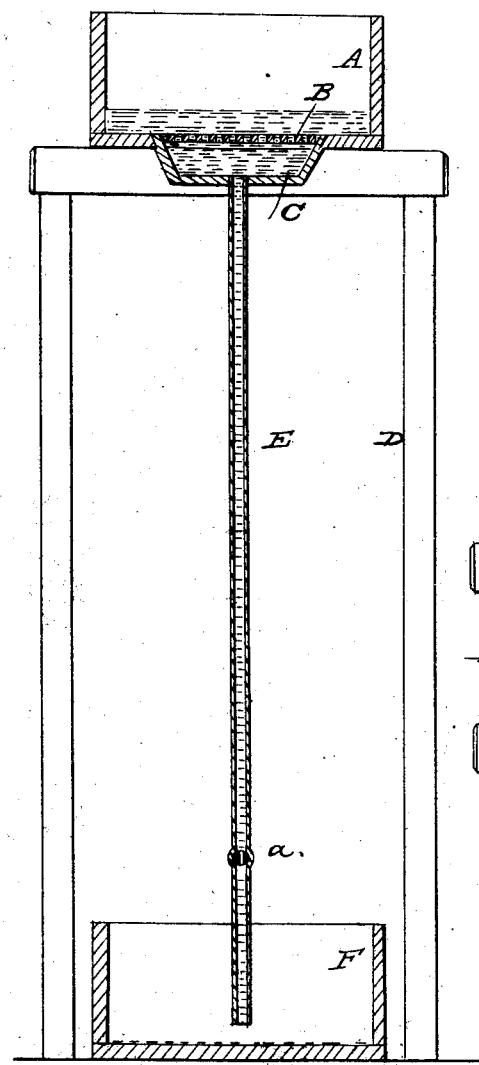
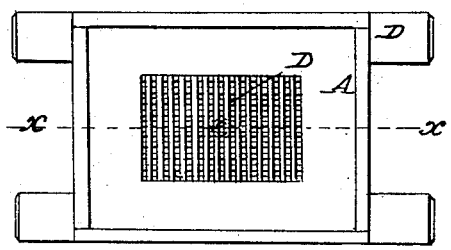
WITNESSES
INVENTOR

UNITED STATES PATENT OFFICE.

LYMAN SMITH, OF ERIE, PENNSYLVANIA.

IMPROVED APPARATUS FOR EXTRACTING OILS, &c.

Specification forming part of Letters Patent No. 46,033, dated January 24, 1865.

*To all whom it may concern:*

Be it known that I, LYMAN SMITH, of Erie, in the county of Erie and State of Pennsylvania, have invented a new and Improved Apparatus for Extracting Oil, &c.; and I do hereby declare that the following is a full, clear, and exact description thereof, which will enable those skilled in the art to make and use the same, reference being had to the accompanying drawings, forming part of this specification, in which—

Figure 1 represents a vertical longitudinal section of this invention taken in the plane indicated by the line $x\,x$, Fig. 2. Fig. 2 is a plan or top view of the same.

Similar letters of reference indicate corresponding parts.

This invention relates to an apparatus which is particularly intended for extracting oil from paraffine, but which can be used for making extracts of any other material.

The invention consists in a tank with a perforated bottom and trough, from which a tube extends downward in a second tank, which tube is provided with a stop-cock in such a manner that when the upper tank is filled with the material to be extracted and with the menstruum used in making the extract and the stop-cock in the tube is opened a vacuum is formed in the trough under the perforated bottom of the tank and the pressure of the atmosphere is brought into action to facilitate the operation of making the extract.

A represents a tank, made of wood or other suitable material, and of any convenient shape or size. This tank is provided with a perforated bottom, B, and a trough, C, is secured to its bottom, which communicates with the interior of the tank through the perforations in the bottom B. The tank A is placed on a frame, D, of considerable height, and from the trough C extends a tube, E, vertically downward, as clearly shown in Fig. 1, of the drawings. This tube terminates in the lower tank, F, which is similar in form to the upper tank, A, as shown in the drawings, and a stop-cock, $a$, inserted in said tube, serves to shut off the communication between the trough C and the lower tank.

The material to be extracted is placed into the tank A, and the trough C and tube E are filled with water or other liquid. On opening the stop-cock $a$ a partial vacuum is formed in the trough C, and the pressure of the atmosphere acting on the material in the tank A facilitates the operation of making the extract.

This apparatus can be used with great advantage for the purpose of extracting oil from paraffine. If the paraffine is left simply to drain, it takes a long time to free it from its oil, and a large quantity of oil still remains adhering to it; but if the paraffine is treated in my apparatus, the atmospheric pressure acting on it expels the oil in a very short time, and much time and labor is saved.

It is obvious, however, that my apparatus may also be used for making extracts from other materials.

I claim as new and desire to secure by Letters Patent—

The tank A, with perforated bottom B and tank C, in combination with the tube E and receiving-tank F, constructed and operating substantially as and for the purpose set forth.

LYMAN SMITH.

Witnesses:
I. R. WOODS,
L. R. SMITH.